April 26, 1932.  B. J. BABBITT  1,855,849
APPARATUS FOR DETERMINING MAGNETIC PROPERTIES OF MATERIALS
Filed Aug. 1, 1927
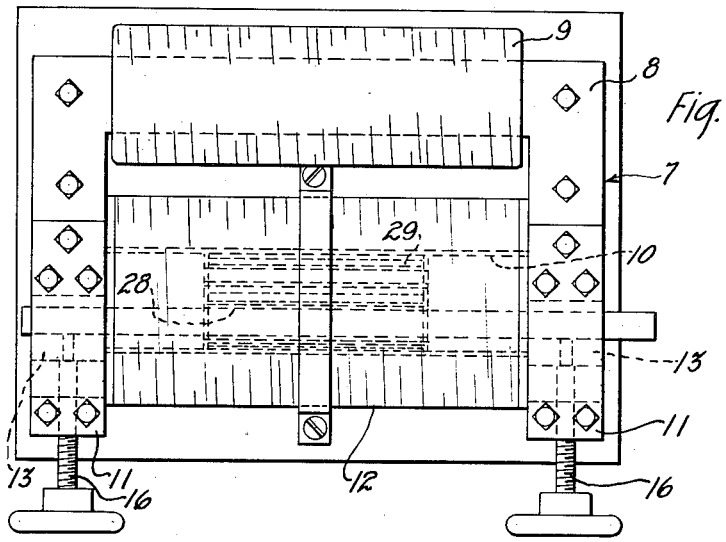
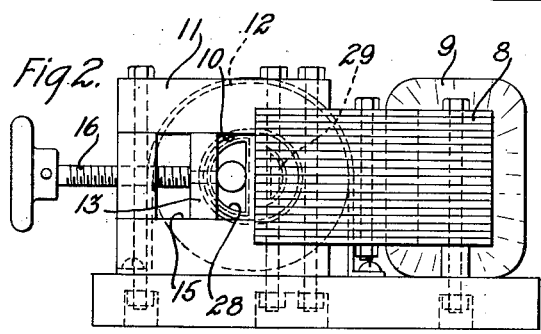
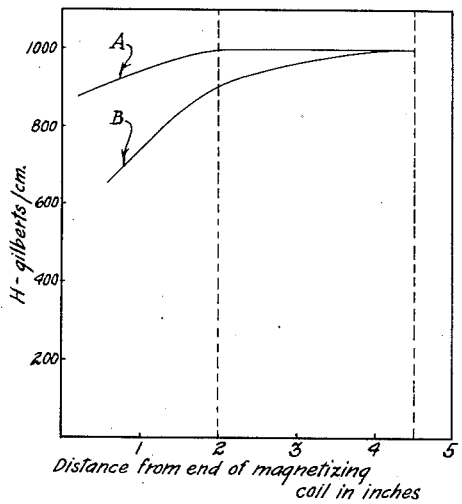
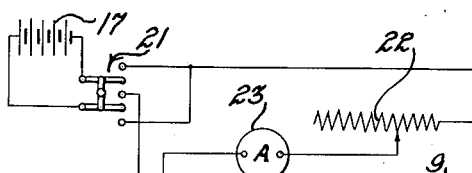
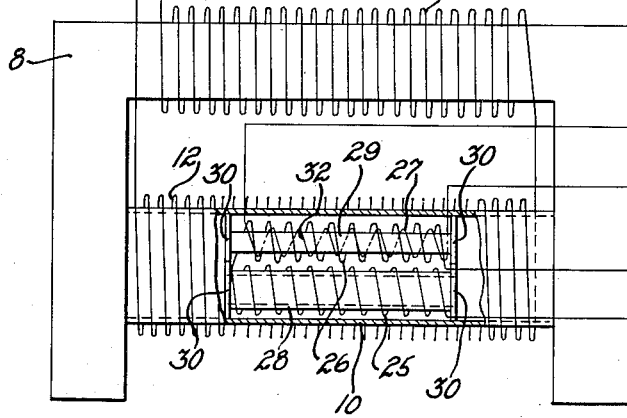
Inventor
Bethel J. Babbitt
by N. A. Pattison Atty.

Patented Apr. 26, 1932

1,855,849

UNITED STATES PATENT OFFICE

BETHEL JAY BABBITT, OF RIVERSIDE, ILLINOIS, ASSIGNOR TO WESTERN ELECTRIC COMPANY, INCORPORATED, OF NEW YORK, N. Y., A CORPORATION OF NEW YORK

APPARATUS FOR DETERMINING MAGNETIC PROPERTIES OF MATERIALS

Application filed August 1, 1927. Serial No. 209,758.

This invention relates to an apparatus for determining magnetic properties of materials, and more particularly to an apparatus for measuring the properties of magnetically retentive materials, such as permanent magnet steels.

An object of the invention is to provide an apparatus for accurately and expeditiously determining properties of magnetic materials.

The invention contemplates the provision of an apparatus in which the specimen whose properties are to be determined may be subjected throughout the portion being tested to a magnetizing force in the vicinity of 1000 gilberts per centimeter which is developed in the same region where it is expended and the strength of which may be measured by a coil placed in the magnetic field adjacent to the coil in which the specimen is inserted for the measurement of its induction. In accordance with one embodiment of the invention, a compensating coil is provided in the same field as the measuring coil to compensate for the air flux in the measuring coil in which the specimen inserted, thereby eliminating the effect caused by a variation in the size of the specimen tested.

It is believed that a complete understanding of the invention may be had by reference to the following description taken in conjunction with the accompanying drawings, in which Fig. 1 is a plan view of an apparatus for determining the properties of magnetic materials;

Fig. 2 is an elevational view of the apparatus;

Fig. 3 is a diagrammatic view of the circuit connections, and

Fig. 4 is a graphic representation of the magnetizing force at different parts along the interior of the main magnetizing coil.

Referring to the drawings in which similar reference characters designate the same parts in the several views, an apparatus for determining the magnetic properties of materials is designated generally by the reference numeral 7 and comprises a laminated U-shaped yoke 8 whose ends terminate in heads 11 of a magnetic material and which are fastened to the yoke by means of bolts. A main magnetizing coil or solenoid 12 is wound upon a brass tube 10 and is provided with a sufficient number of turns to produce magnetizing forces of approximately 1000 gilberts per centimeter. The brass tube 10 is supported between the heads of the yoke in such a manner that one-half of the opening of the tube is covered by the yoke while the other half is open to permit the insertion of a specimen to be tested. A clamping member 13 slidably movable in a rectangular opening 15 in the head 11 may be moved into engagement with the specimen by means of a screw 16 to hold it in place while being tested.

The main magnetizing coil 12 is connected in series with an auxiliary coil 9 which is supported on the base of the U-shaped yoke and a source of electrical energy 17 which is connected to the coils through a reversing switch 21 is provided to supply electrical current to the coils. The coil circuit also includes a rheostat 22 and an ammeter 23.

In order to render the relation of the magnetizing force in the coil 12 to the current therein, constant over a wide range of values of the magnetizing force, the laminations of the yoke 8 may be made of materials having different permeabilities and different saturation values. It has been found that a very efficient yoke having a constant permeability for widely different values of induction and therefore particularly adapted for an apparatus for determining the magnetic properties of materials may be constructed by making 35 per cent of the laminations of permalloy (nickel-iron alloy), 10 per cent of the laminations of silicon steel, and 55 per cent of the laminations of magnetic iron. Each of these materials has different characteristics and a yoke built up in this manner has an aggregate characteristic giving it a constant permeability for widely different values of induction and therefore the magnetizing force in the coil 12 will be proportional to the current for such values as the permeability is constant making the yoke suitable for use in an instrument of this type.

By providing a main magnetizing coil 12, nine inches in length with a yoke wound with an auxiliary coil as described above, the magnetizing force in the coil 12 may be made uniform to within two inches from either end of the coil for values of the magnetizing force approximately 1000 gilberts per centimeter. This is shown graphically in Fig. 4 in which the abscissas indicate the distance from either end of the coil and the ordinates indicate the magnetizing force in gilberts per centimeter for a given value of current in the coil. The curve A represents the magnetizing forces in the coil 12 at various distances from the end with the auxiliary coil 9 energized in series with the coil 12 showing a constant value of the magnetizing force from the center of the coil to within two inches from the end of the coil where it begins to drop slightly. The curve B represents the magnetizing force in the same coil and under similar conditions with the auxiliary coil deenergized showing a constant value of the magnetizing force for only a very small distance at the center of the coil after which it drops considerably.

A coil 25 in which the specimen to be tested is inserted, is located within the region of uniformity of the magnetic field in the central portion of the magnetizing coil 12 and is wound upon a semi-circular brass tube 28. A compensating coil 26 is wound upon a second brass tube 29 and is connected in series with and in opposition to the coil 25 so that the air flux which is equal in the coils 25 and 26 will have no effect upon a galvanometer 31 which is connected in circuit with these coils, when the current through the magnetizing coil 12 is reversed. The purpose of the compensating coil 26 is to eliminate errors due to the variation of the cross-sectional areas of test specimens by eliminating the air flux and therefore in order to obtain the total induction of a specimen the value of the magnetizing force must be added to the value of the induction of the specimen as indicated by the galvanometer 31. The ends of the brass tubes 28 and 29 are provided with heads having semi-circular peripheries and the pair of heads at the ends of the tubes form circular supports fitting in the tube 10 to hold the coils in place. The brass tube 29 also carries a coil 32 connected to a galvanometer 33 for measuring the value of the magnetizing force in the uniform area of the magnetizing coil 12.

The galvanometer 33 is calibrated to read the value of magnetizing force of the coil, and since the magnetizing force in the coil 12 is proportional to the current therein, the ammeter 23 may also be calibrated to read magnetizing force and thus serve as a direct reading substitute for the galvanometer 33.

The galvanometer 31 is calibrated to indicate the ferric induction of the material to be tested, that is, the valve $4\pi I$, where I represents the intensity of magnetization. In order to obtain the total induction B, the lines of force of the magnetic field H must be added to the value of $4\pi I$. Since the magnetizing force throughout the length of the coil 25 is uniform, the indication of the galvanometer 31 will always be proportional to the ferric induction of the material being tested.

In determining the magnetic properties of a material, a specimen of uniform cross section is made having a sufficient length to bridge the ends of the yoke and be clamped in the heads 11 by the clamping members 13. When the specimen is located in the proper position the switch 21 is closed and the rheostat 22 is adjusted until the magnetizing force in the coil 12 reaches a predetermined value as indicated by the ammeter 23. The current is then reversed several times by means of the reversing switch 21 until steady conditions are obtained before a reading is made. The reversal of the magnetic field will have no inductive effect upon the coils 25 and 26 because they are wound in opposition to each other, however, there will be an inductive effect in the coil 25 due to the reversal of the magnetic induction in the specimen being tested which passes through the coil 25, and the magnitude of this effect will be indicated by the galvanometer 31 as the ferric induction of the specimen. The total induction is then found by adding the value of the magnetizing force as indicated by the ammeter 23 or the galvanometer 33.

In order to determine the residual magnetism of the specimen, the specimen is magnetized in the same manner as described above, after which the current is merely interrupted instead of reversed. The reading of the galvanometer 31 must then be subtracted from the total induction in order to obtain the residual induction since the galvanometer in that case indicates the extent of demagnetization when the magnetizing force is removed.

In view of the fact that the magnetizing force is developed in the same region where it is expended and the measuring coils 25, 26 and 27 are all located in that portion of the magnetizing coil 12 in which the magnetizing force is uniform for extremely high values of the magnetizing force, the apparatus has been found to give very accurate results in determining the properties of magnetic material when subjected to high magnetizing forces.

It will be understood that the embodiment of the invention herein described and illustrated is merely a convenient and useful form of the invention which is capable of many other modifications without departing from the spirit and scope of the invention.

What is claimed is:

1. In an apparatus for determining the magnetic properties of magnetic material, a solenoid for magnetizing the material, a laminated yoke comprising laminæ of materials having different magnetic characteristics, and means associated with the solenoid for measuring the induction of the material being tested.

2. In an apparatus for determining magnetic properties of magnetic material, a magnetizing coil, means for producing a uniform magnetizing force in a portion of said coil, comprising a yoke constructed of materials having different magnetic characteristics, a coil for energizing the yoke, and a measuring coil located inside the portion having the uniform magnetizing force.

3. In an apparatus for determining the magnetic properties of magnetic material, a yoke of magnetic material, a solenoid supported between the ends of the yoke, and an auxiliary coil wound upon the yoke, all so proportioned that the magnetizing force in the interior of the solenoid is directly proportional to the magnetizing current employed up to values of magnetizing force in excess of 1,000 gilberts per centimeter.

4. In an apparatus for determining the magnetic properties of magnetic material, a solenoid for impressing a magnetizing force upon the material, a yoke having a constant permeability for widely different values of induction and for supporting the solenoid, and a coil within the solenoid for determining the induction in the material due to the impressed magnetizing force.

5. In an apparatus for determining the magnetic properties of magnetic material, a solenoid for impressing a magnetizing force upon the material, a source of current for energizing the solenoid, means for maintaining a constant relation between the magnetizing force in the solenoid and the current therein, a coil within the solenoid for determining the induction in the material, and a second coil within the solenoid for determining the strength of the magnetizing force.

6. In an apparatus for determining magnetic properties of magnetic material, a magnetizing coil, means for producing a uniform magnetizing force in a portion of said coil, comprising a yoke constructed of materials having different magnetic characteristics, and a measuring coil located inside the portion having the uniform magnetizing force.

7. In an apparatus for determining magnetic properties of magnetic material, a magnetizing coil, means for producing a substantially uniform magnetizing force in a portion of said coil, comprising a yoke constructed of U-shaped laminations and supporting said magnetizing coil between its ends, a coil for energizing said yoke and a measuring coil located inside the portion having the uniform magnetizing force, an end of said magnetizing coil being open to receive a test piece of magnetic material.

In witness whereof, I hereunto subscribe my name this 20 day of July A. D., 1927.

BETHEL JAY BABBITT.